US012632743B2

(12) United States Patent
Sagalovsky et al.

(10) Patent No.: US 12,632,743 B2
(45) Date of Patent: May 19, 2026

(54) RANDOM FOREST RULE GENERATOR

(71) Applicant: Stripe, LLC, South San Francisco, CA (US)

(72) Inventors: Ariel David Sagalovsky, San Francisco, CA (US); Chiranth Manjunath Hegde, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 886 days.

(21) Appl. No.: 17/894,580

(22) Filed: Aug. 24, 2022

(65) Prior Publication Data

US 2024/0070474 A1     Feb. 29, 2024

(51) Int. Cl.
| | |
|---|---|
| *G06N 5/01* | (2023.01) |
| *G06F 18/21* | (2023.01) |
| *G06F 18/2113* | (2023.01) |
| *G06F 18/22* | (2023.01) |

(52) U.S. Cl.
CPC .......... *G06N 5/01* (2023.01); *G06F 18/2113* (2023.01); *G06F 18/217* (2023.01); *G06F 18/22* (2023.01)

(58) Field of Classification Search
CPC ......... G06N 5/01; G06F 18/22; G06F 18/217; G06F 18/2113
See application file for complete search history.

(56) References Cited

U.S. PATENT DOCUMENTS

| | | | | |
|---|---|---|---|---|
| 12,118,558 B2 * | 10/2024 | Marom | .............. | G06Q 20/4016 |
| 2018/0349384 A1 * | 12/2018 | Nerurkar | .......... | G06F 16/24578 |
| 2019/0026489 A1 * | 1/2019 | Nerurkar | ................ | G16H 10/60 |
| 2020/0151825 A1 * | 5/2020 | Cohen | ....................... | G06N 5/04 |
| 2020/0387835 A1 * | 12/2020 | Sandepudi | ............. | G06N 20/20 |
| 2020/0394659 A1 * | 12/2020 | Qu | ........................... | G06N 20/20 |
| 2021/0304204 A1 * | 9/2021 | Ramesh | ................... | G06N 5/01 |
| 2021/0326904 A1 * | 10/2021 | Palekar | ................... | G06N 5/01 |
| 2022/0101190 A1 * | 3/2022 | Kanter | ................. | G06F 16/285 |
| 2022/0121967 A1 * | 4/2022 | Azizsoltani | ............ | G06N 5/025 |
| 2023/0252477 A1 * | 8/2023 | Juneja | ............... | G06Q 20/4016 705/39 |

OTHER PUBLICATIONS

Maoloud Dabab et al., A Decision Model for Data Mining Techniques, Engineering & Technology Management Dept., Portland State University, Portland, Oregon USA, Conceptrics AG, Portland, Oregon USA & Kyoto, Japan, 8 pages (Year: 2018).*

* cited by examiner

*Primary Examiner* — Barbara M Level
(74) *Attorney, Agent, or Firm* — BAKERHOSTETLER

(57)     ABSTRACT

In an example embodiment, a random forest machine learning algorithm is used to create and/or identify rules to apply to an individual entity in a computer system that has a plurality of entities, each with a number of rules. More precisely, rule predicates are used as features of a random forest model built to predict a particular outcome (e.g., a transaction that is fraudulent). Hyperparameters of the random forest model are varied and iterated. A classifier is used to calculate feature importance for all features in the training data. Feature importance may be calculated using permutation feature importance. The N "most important" features are then found from this set. The N "most important" features are then used to find rules above a certain precision and recall rate. These rules may then be backtested and the best rules can be used to generate additional rules.

20 Claims, 8 Drawing Sheets

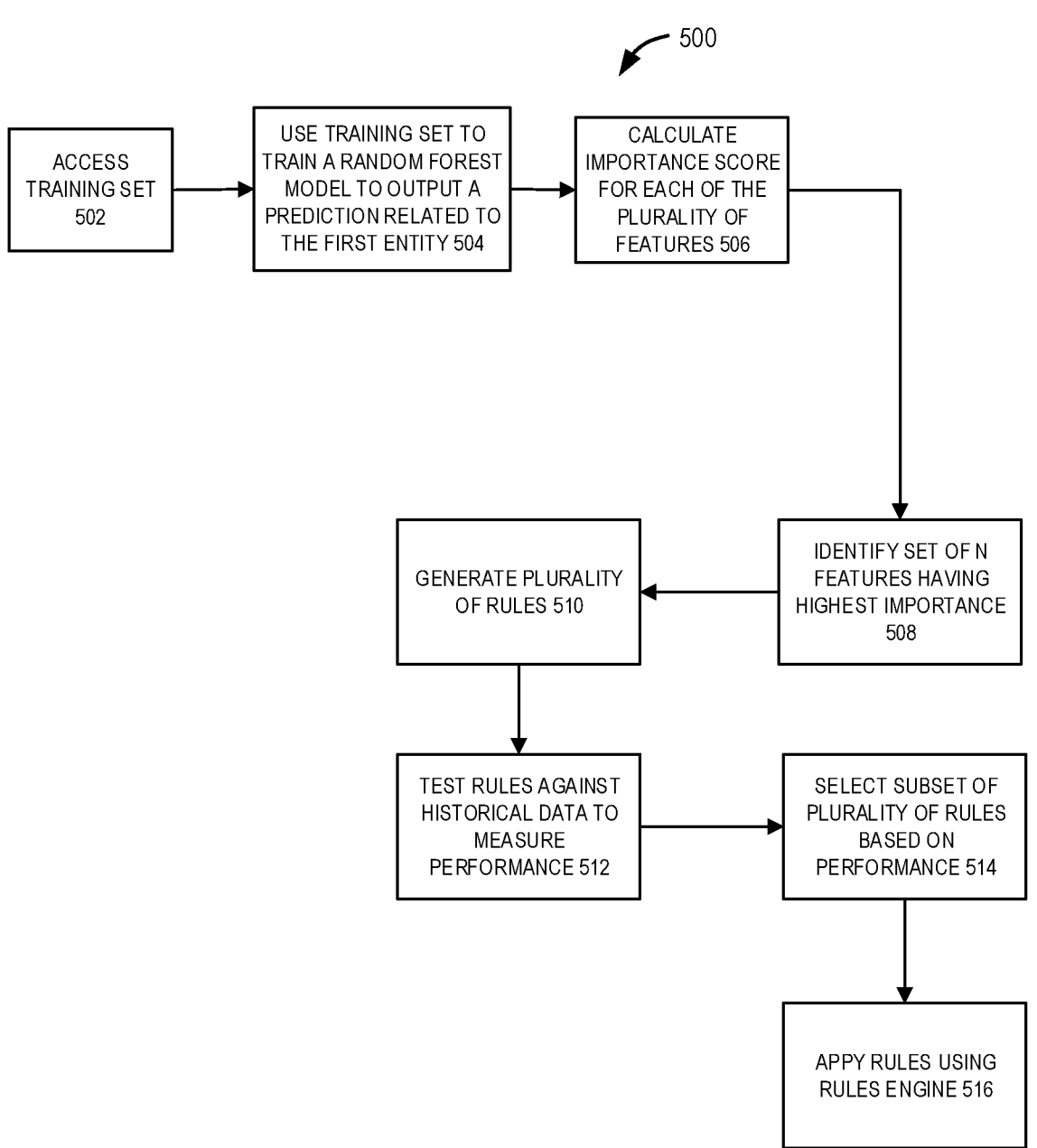

500

ACCESS TRAINING SET 502

USE TRAINING SET TO TRAIN A RANDOM FOREST MODEL TO OUTPUT A PREDICTION RELATED TO THE FIRST ENTITY 504

CALCULATE IMPORTANCE SCORE FOR EACH OF THE PLURALITY OF FEATURES 506

IDENTIFY SET OF N FEATURES HAVING HIGHEST IMPORTANCE 508

GENERATE PLURALITY OF RULES 510

TEST RULES AGAINST HISTORICAL DATA TO MEASURE PERFORMANCE 512

SELECT SUBSET OF PLURALITY OF RULES BASED ON PERFORMANCE 514

APPY RULES USING RULES ENGINE 516

*FIG. 5*

RANDOM FOREST RULE GENERATOR

TECHNICAL FIELD

The subject matter disclosed herein generally relates to machine learning. More particularly, the subject matter disclosed herein relates to a random forest rule generator.

BACKGROUND

Machine learning is used in a wide variety of applications. In some applications, machine learning is used to automatically determine and/or recommend rules to be implemented on a computer system. One example is for computer systems that process transactions. Fraudulent transactions are a problem for such systems, and often such systems implement rules to reduce fraudulent transactions, such as limiting a transaction value in certain circumstances (e.g., from certain high-risk countries), or performing additional verification in certain circumstances (e.g., requiring two-factor authentication).

Traditionally, such rules were implemented as a "one size fits all solution," meaning that in the transaction space, the rules would apply to transactions for all merchants. This adds difficulty, however, because a particular rule may not work the best for every merchant.

One solution would be to permit merchants (or other individual entities, in non-transaction-based computer systems) to set individualized rules. These rules can be difficult for individual users, however, to establish, especially when relevant historical data is minimal (e.g., for merchants who do not have a large amount of prior transaction data to evaluate). The result is that users either wind up creating ad-hoc rules with lower accuracy rates, or needing to hire domain experts to create individualized rules for the entities (e.g., merchants). The domain experts delve deeply into the available historical data, not just for the individual entity but also for entities in a similar "segment", to attempt to derive patterns to be used to create entity-specific rules. Additionally, a technical challenge is encountered in scaling a solution from one merchant to thousands of merchants.

BRIEF DESCRIPTION OF THE DRAWINGS

Some embodiments are illustrated by way of example and not limitation in the figures of the accompanying drawings.

FIG. 5 is a flow diagram illustrating a method of using a random forest machine learning model, according to some example embodiments.

DETAILED DESCRIPTION

Figure 1:
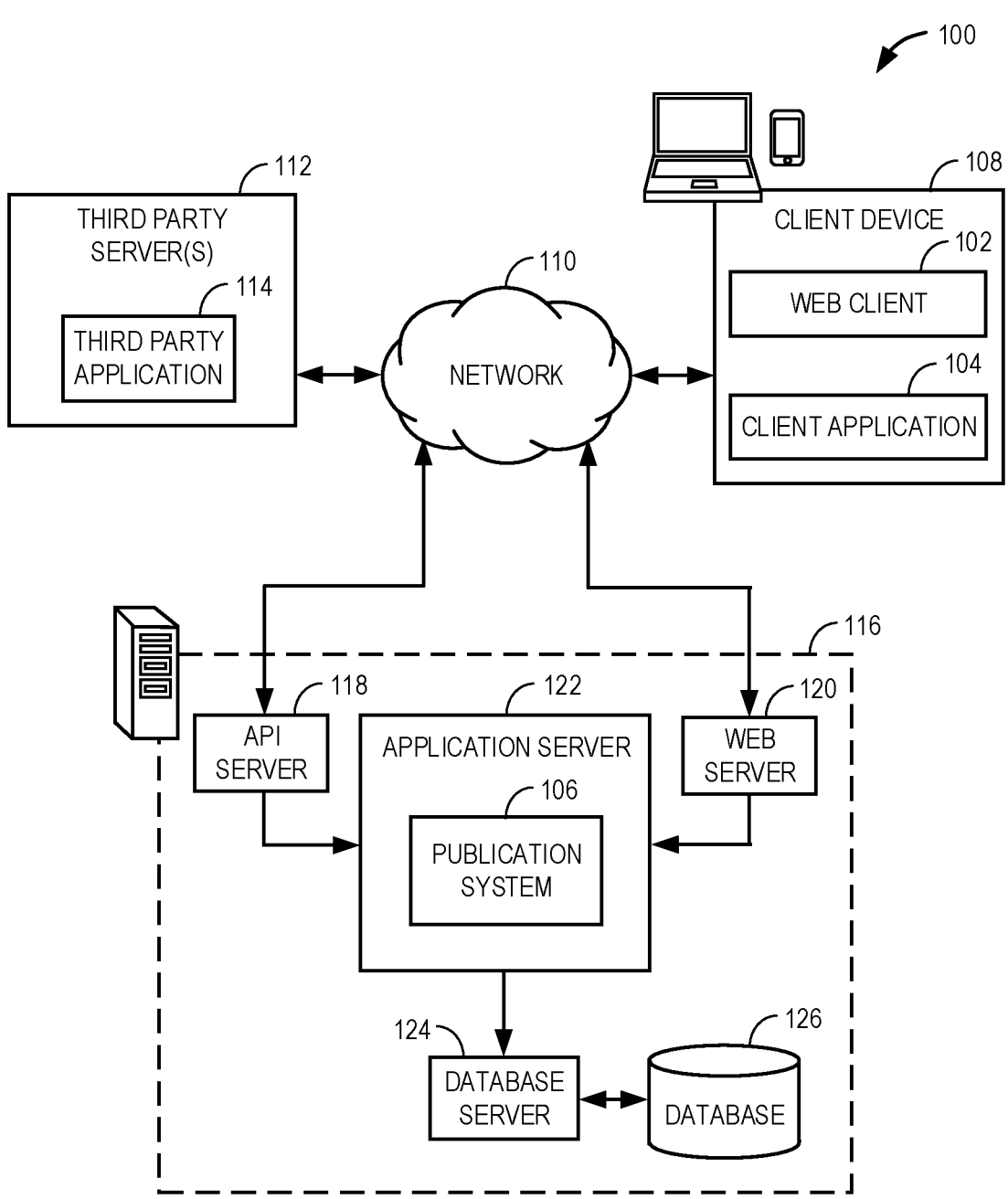
FIG. 1 is a block diagram illustrating a high-level network architecture, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In an example embodiment, machine learning is utilized to create and/or identify rules to apply to an individual entity in a computer system that has a plurality of entities, each with a number of rules.

One way to implement machine learning to create and/or identify rules to apply to an individual entity in a computer system is to use so-called decision trees. A decision tree is a type of supervised machine learning used to categorize or make predictions based on historical information. The base of a decision tree is a root node. From the root node flows a series of decision nodes that depict decisions to be made. From the decision nodes are leaf nodes that represent the consequences of those decisions. Each decision node represents a question or split point, and the leaf nodes that stem from a decision node represent the possible answers.

Building a decision tree involves construction, in which attributes and conditions are selected that produce the tree. Then, the tree is pruned to remove irrelevant branches that could inhibit accuracy, by, for example, identifying outliers.

A technical issue, however, is encountered in the use of decision trees to create and identify rules to apply to an individual entity in a computer system. Specifically, when applied to historical data having a large number of dimensions (e.g., a large number of potential variables to which to apply the rules), overfitting occurs. More particularly, a particular entity's recommended rules from a decision tree model wind up being too specific for the particular entity, which limits their ability to be applied to other entities, even ones who are similar (e.g., same segment). While that may be fine for entities who have large amounts of historical data to build an accurate decision tree, for other entities who do not have large amounts of historical data, this winds up limiting the ability of the system to share (or at least borrow from) rules from entities who have large amounts of historical data or otherwise pool rules or data among multiple entities. Transaction data is an example of data that has high dimensionality. Essentially, any value in a transaction (e.g., amount, location, number of transactions during a period, transaction pattern, purchaser identifier, purchaser details, method of payment, etc.) is a potential variable for a rule, and thus the decision tree approach winds up overfitting. In the transaction data case, an overfitted rule might, for example, contain too many subrules on too many variables, such that the rule may work well for one merchant but not another, similar, merchant.

Therefore, in order to overcome these technical limitations of decision tree machine learning algorithms in an example embodiment, a random forest machine learning algorithm is used to create and/or identify rules to apply to an individual entity in a computer system that has a plurality of entities, each with a number of rules. More precisely, rule predicates are used as features of a random forest model built to predict a particular outcome (e.g., a transaction that is fraudulent). Hyperparameters of the random forest model are varied and iterated until an acceptable area under the curve (AUC) is achieved. Then, a method is used to calculate feature importance for all features in the training data. Feature importance may be calculated using permutation feature importance. The N "most important" features are then found from this set. The N "most important" features are then used to find rules above a certain precision and recall rate. Specifically, rules may be found by iterating over quantiles of feature distribution. These rules may then be backtested and the best rules can be used to generate rules with more than one predicate.

In the present disclosure, inventive aspects will be described using the case of a transaction system, and specifically using the random forest model to create and/or identify rules to reduce transaction fraud in a transaction system. It should be noted, however, that the inventive aspects are not limited to implementation in a transaction system, and can be applied to other systems as well. As such, nothing in this disclosure shall be interpreted as limiting protection to transaction systems, unless explicitly recited in the claims.

Generally, the process can be envisioned as a two-part process. In the first part, attributes in the training data that make sense as candidates for rule are identified. In the second part, the specific rules to actually generate are determined, based in part on the identified attribute candidates. The random forest model allows the system to understand which features have the highest "importance" in the training data, and then a subset of features can be selected for rule generation using this "importance" information.

An attribute is a feature that can be used for rule writing. A candidate threshold is a value used to generate a rule. A predicate is a comparison between an attribute and a threshold. A rule is one or more predicates evaluated against an input. A hyperparameter is a number of value that determined the architecture for a model.

Rule predicates are functions that test some condition of their arguments. In an example embodiment, the arguments considered include all the features of the training data but also include one or more hyperparameters, and the random forest model is built to predict transaction fraud using all possible combinations of these features with all possible functions, using a variety of hyperparameter values. In a transaction system, for example, a predicate may determine, for example, a number of fraudulent transactions from a particular location and compare that number to a threshold value. The threshold value in this case would be a hyperparameter and the number of fraudulent transactions from a particular location is a feature of the training data.

The random forest model is then built to predict the particular outcome (e.g., transaction fraud) using the rule attributes as features. The building involves training the random forest model with the training data, and varying the hyperparameters and iterating until a good AUC is achieved for the particular entity (e.g., merchant) or group of entities (e.g., group of merchants). This improves upon the decision tree approach, which overfitted on one particular feature due to a large entropy gain. It is not able to sufficiently randomize and find the group of most important features.

A random forest model operates by creating many trees, with each tree having some randomness built into it. The random forest model is then able to arrive at a decision by utilizing all of the predictions made by the many trees. For a classification task, the output of the random forest is, for example, the class selected by the most trees. For egression tasks, the mean or average prediction of the trees is returned.

Consider the random forest as a collection of trees and at each tree a decision will be made based on the attribute. For instance, at the root of the forest may be a tree which asks, "was the transaction a Visa credit card transaction?" If yes, then a "yes" branch is followed and if no, then the other branch is followed. Consider in this example the answer is, "yes, the transaction is a Visa credit card transaction," and so the processing follows the "yes" branch to the right and encounters another decision point, asking "was this card utilized more than four times in the past 24 hours?" Again, if the answer is yes, then the yes branch is followed and if the answer is no, then the no branch is followed. Eventually, after asking a multitude of such questions, processing ends up at a leaf which consists of all sample or past charges matching the same series of predicates. For instance, the sample may be a sub-set of past data or the entirety of past transaction data for a given range, etc. Regardless, at that leaf, the system may determine that out of 100 samples present at that leaf, 80 of the charges were not deemed fraudulent, and 20 were determined to be fraudulent. With this information, the system generates a fraud likelihood score.

However, in order to determine what attribute contributes most to that resulting fraud likelihood score, the system takes both paths for the question "was the transaction a Visa credit card transaction?" Therefore, rather than taking the "yes" branch, both branches are followed as if it were unknown whether the transaction was a Visa credit card transaction. Then, both branches are followed to the terminal leaf where a fraud likelihood score may then be established for each path, both the "yes" and the "no," for the transaction's total collection of attributes, without knowing whether or not the transaction was a Visa credit card transaction. The resulting fraud likelihood scores are then compared to determine their difference. A small difference may indicate that the branding of this transaction was not a large contributor to the score, whereas a large difference may indicate that the card branding (e.g., Visa or otherwise) was a significant contributor. Next, both branches are followed for the other remaining attributes. For instance, both the yes and no branches may be followed by the question, "was this card utilized more than four times in the past 24 hours?"

At the end of the processing, rather than having a single terminal leaf to generate the fraud likelihood score, a collection of leaves is obtained and then aggregated over all the leaves (for example fifty total leaves collected), with attributes that, when omitted, result in a greatest difference in the resulting fraud likelihood score. For example, when omitting the Visa branding from the analysis results in half the leaves being score fraudulent and half the leaves being scored not fraudulent. Consequently, it may be observed that the branding of the card, Visa or otherwise, is not an indicator of fraud. Rather, the attribute that, when omitted, maximizes the difference between the original score and a new nondeterminate evaluated score, when that feature is omitted, may thus be considered to be a large contributor to the resulting fraud likelihood score, or the resulting allowance of the transaction as non-fraudulent, depending on whether the inquiry is one of "why was this transaction rejected" or "why was this transaction allowed." In such a way, the identification of the attribute or feature which makes the biggest difference in the value of the score may be deemed the "most important" attribute or feature. Indeed, the difference itself can be considered a measure of "importance" of the feature, allowing ranking and other comparisons among the features.

As such, in an example embodiment, a classifier of the random forest model is used to calculate feature importance for all features in the training data, such as by using the difference in the value of the score.

In an example embodiment, the importance scores for the features are used to identify the N most important features in the training set, meaning the N features with the highest importance scores. In an example embodiment, N is set at 25.

Once this set of N most important features is identified, this set may be used to generate rules. This may be accomplished in a number of different ways. In an example embodiment, a quantile technique is utilized. In a quantile technique, for each of the N most important features, a set of quantiles are identified, such as the $25^{th}$ percentile, $50^{th}$ percentile, $75^{th}$ percentile, $90^{th}$ percentile, and $99^{th}$ percentile. The values for the features at each of these percentile thresholds is determined. Thus, for example, if one of the features is number of transactions for a user, this technique would rank all the users based on their number of transactions, and then identify the number of transactions of the users who were a quarter of the way up that list, halfway up that list, ¾ of the way up that list, 90% up that list, and 99% up that list. Each of those values are then used as the candidate thresholds in various generated rules. The generated rules include the rule predicates in various combinations with each other and also with the various determined candidate thresholds.

In an example embodiment, a maximum number of combinations of rule predicates may be established and utilized for this rule generation process, to eliminate rules that are likely to simply be too narrow. Thus, for example, assume training data with over 300 different features of transactions. The random forest model may identify the 25 most important of these features. The rule generator may be set with a predicate maximum of, for example, 3. Thus, the rule generator may then generate a variety of rules that include predicates involving up to 5 different of these 25 most important features at once. Thus, in this case, no rule will be generated that combines more than three predicates, but the features(arguments) for these predicates will be selected from only the 25 of the most important features from the training data, and the hyperparameters for the various rules will include values for each of the quantiles for comparison with each such feature.

Thus, one example rule generated might be that the number of transactions for the user is less than whatever the value is of the user's data 25% of the way up the number of transactions list, along with the value of the transaction, less than whatever value is of the user's data 25% of the way up the transaction value list. Another rule might be that same rule, with a slight variation in the hyperparameters, such that if the number of transactions for the user is less than whatever the value is of the user's data 25% of the way up the number of transactions list, along with the value of the transaction less than whatever value is of the user's data 50% of the way up the transaction value list. All of the quintiles may be used to generate different combinations of this rule, and then various combinations of the 25 most important features can be used to create other rules, with their own different combinations of quintiles, including combinations of rules up from one to three predicates combined.

Each of these generated rules are then backtested. Backtesting the rules involves testing the generated rules on the training data or other historical data sets and measuring performance. Performance may be measured in a number of different ways, depending upon the goals of the model. In a transaction system, the goals may include determining a revenue or profit of a given rule. More particularly, actual sales in the historical data can be compared to sales generated in the backtesting process, to determine whether rules increased or decreased revenue and/or profit. Profitability may necessitate that the historical data include costs of the sales to the merchant and/or profit margins. Rules that increase revenue and/or profitability may "pass" the backtesting process, although in some example embodiments, some threshold level of increase in revenue and/or profitability may need to be transgressed in order to formally adopt or recommend the rule.

Another possible way to measure performance is to compare the model to a more generic fraud prevention model. Such a generic model may apply to all merchants, for example, and thus the performance of the merchant-specific model would be compared to the performance of the generic model to determine whether the merchant-specific model performed better.

It should also be noted that the N value need not be fixed. It can be varied depending upon various factors, including merchant, merchant segment, etc. Indeed, in some example embodiments, the value for N can be learned via machine learning. The machine learning algorithm may iterate, among various parameters, changing parameters (weights) multiplied by various input variables, and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The machine learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In another example embodiment, rather than a quantile technique, decision tree algorithm, a boosted tree algorithm or a recursively partitioned tree algorithm can be used for the rule generation process. Using one of these techniques, no quantiles are specified, a decision tree can be built on just the data from the top N features, and the most optimal partition of this decision tree can be identified. Pruning can then be used to control the depth of the tree, which in effect controls how many predicates the rules have. A similar technique can be used with a boosted tree. In a boosted tree embodiment, the concept is that one tree is used, an error is measured, and then the next tree is built trying to address that error.

One of the benefits of using the above-described random forest model to solve the technical problems described, is that the generated rules are not overfitted for particular entities, which permits easier "sharing" of generated rules among entities, and more particularly among entities that are similar. For example, a rule generated for a first merchant in a segment may be recommended for another merchant in that same segment.

Other than fraud detection, the above techniques can be used for other types of fraud, other than merely transaction fraud. Examples include merchant fraud (fraud where the merchant is committing the fraud rather than the purchaser). Furthermore, other models can benefit from the above techniques, such as a model to predict a likelihood that a payment method, such as a credit card, will be validated.

In another example embodiment, the above techniques may be used, even with features that are hidden or otherwise not known to a payment processing service. For example, the system may be designed such that input to the random forest training component can include data from the merchants themselves, which may include one or more features that are not contained in data collected by the corresponding payment processing system, or even features that are deliberately hidden, or otherwise kept secret, from the corresponding payment processing system. Thus, for example, a payment processing system may track transaction data, having 300 different features. One merchant of the payment processing system may track their own data, which includes 10 features not included in the 300 features tracked by the payment processing system. Both the data from the payment processing system and the data from the merchant can be used as input to the component performing the training of the random forest model, so that the random forest model outputs the N most important features from among all 310 features, whether they be payment processor tracked features, merchant tracked features, or some combination of both. Indeed, the system may be designed to continue to keep the merchant tracked features secret from the payment processor. In other cases, the payment processor may be aware of the merchant tracked features themselves, but the actual values for those features in the merchant data can be kept secret from the payment processor. This may be an important tool in situations where the merchant tracked data is subject to some sort of privacy constraints, whether legal or business in nature, such as where the merchant tracked data includes health data.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (e.g. the publication system hosted at https://stripe.com by Stripe, Inc. of San Francisco, CA (herein referred to as "Stripe") as an example of a payment processor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
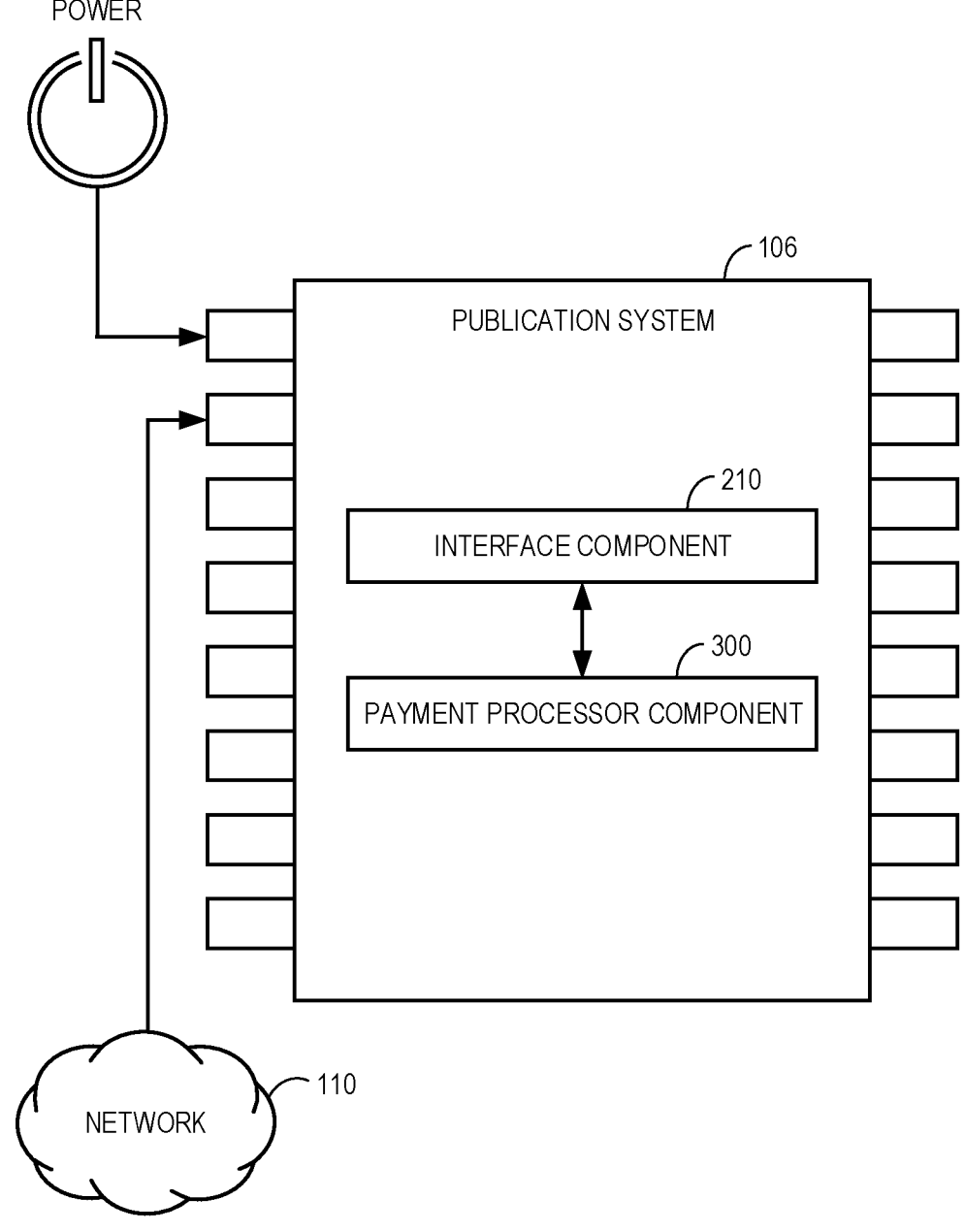
FIG. 2 is a block diagram showing architectural aspects of a publication system, according to some example embodiments.

FIG. 2 is a block diagram showing architectural details of a publication system 106 of FIG. 1, according to some example embodiments. Specifically, the publication system 106 is shown to include an interface component 210 by which the publication system 106 communicates (e.g., over a network 110) with other systems within the SaaS network architecture 100.

Figure 3:
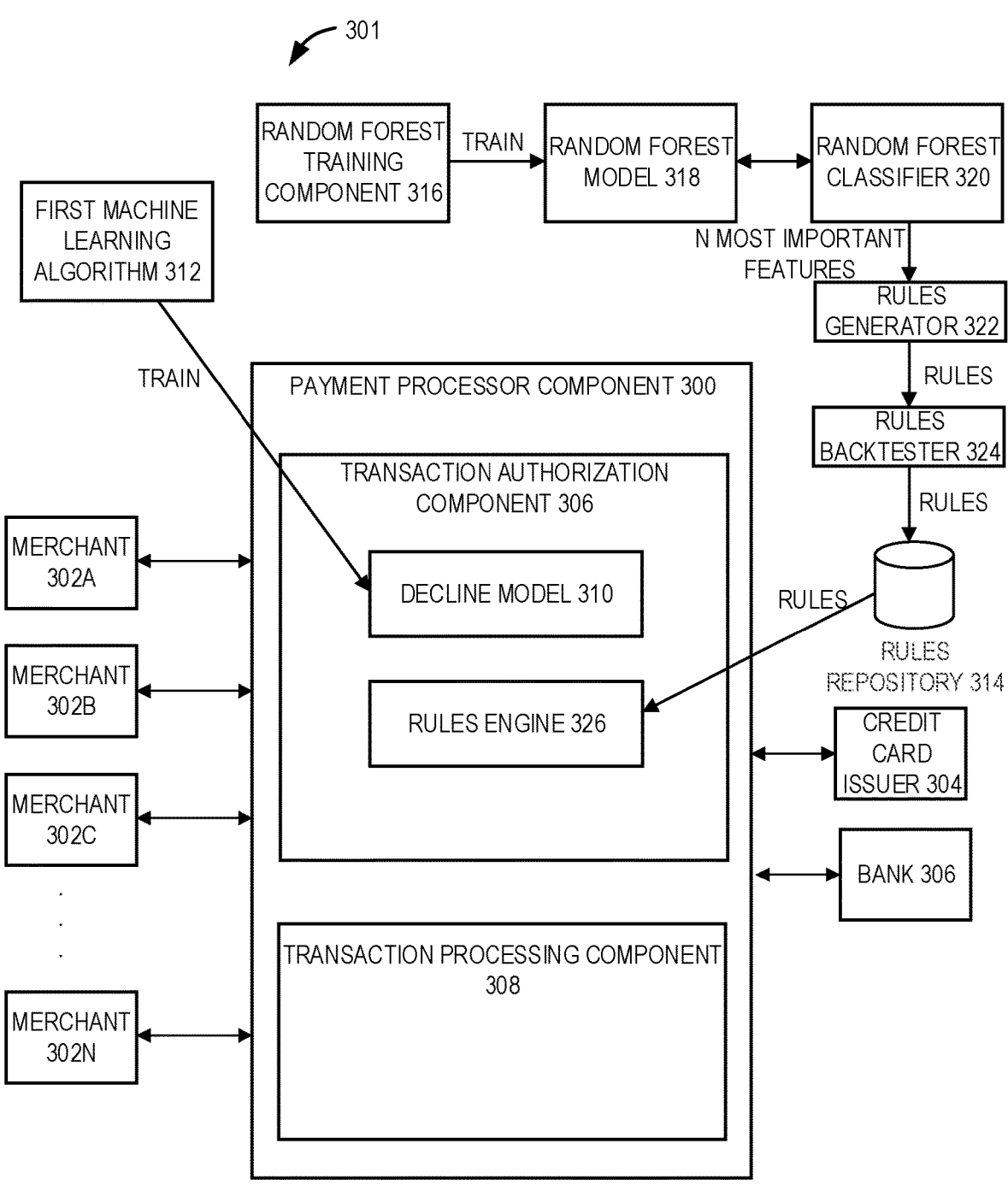
FIG. 3 is a block diagram illustrating a system, according to some example embodiments.

The interface component 210 is communicatively coupled to a payment processor component 300 of FIG. 3 that operates to provide payment processing functions for a payment processor in accordance with the methods described herein with reference to the accompanying drawings.

FIG. 3 is a block diagram illustrating a system 301 in accordance with an example embodiment. The system includes the payment processor component 300 from FIG. 2, which communicates with one or more merchants 302A-302N as well as with credit card issuer 304, and bank 306 via network 110. It should be noted that while only a single credit card issuer 304 and bank 306 are shown here, in actuality, the payment processor component 300 may have connections available to many credit card issuers and banks, as well as any other entities necessary to process a transaction using any allowed payment type.

Payment processor component 300 includes a transaction authorization component (bank 306) and a transaction processing component 308. The transaction processing component 308 takes as input information about a potential transaction from a merchant 302A-302N. It then decides whether or not to request validation for the transaction from the credit card issuer 304 and/or bank. As will be explained in more detail below, the transaction processing component 308 utilizes a decline model 310 to make this decision. When validation requests are made, they are sent to the credit card issuer 304 and/or bank 306, which then make a final decision as to whether to indicate that the transaction is valid and send this final decision to the payment processor component 300.

Separately, once the potential transaction has been accepted (via an accept on a separate authorization request), the transaction processing component 308 processes the payment itself, via communication with the credit card issuer 304 and/or bank 306.

The decline model 310 is a machine learning model trained by a first machine learning algorithm 312 to predict a likelihood that a particular transaction is fraudulent or otherwise malicious. It should be noted that for purposes of the present disclosure, the term "fraudulent" is used broadly to refer to any behavior that is likely to result in the payee not receiving or not being able to keep funds that were designated to be paid to them during the transaction. In other words, it can cover actions that may not meet the legal definition of "fraud," but are still ones that the payee would likely wish to avoid. Thus, for purposes of this disclosure, the term "fraudulent" shall be interpreted to include any negative behavior, whether intentionally malicious or not, that would negatively impact the likelihood of the payee ultimately receiving and keeping the funds that are a part of the transaction.

The first machine learning algorithm may iterate, among various parameters, changing parameters (weights) multiplied by various input variables, and evaluating a loss function at each iteration, until the loss function is minimized, at which stage the parameters for that stage are learned. The training data may include labeled data, as described earlier. Specifically, the weights are multiplied by the input variables as part of a weighted sum operation, and the weighted sum operation is used by the loss function.

The first machine learning algorithm may also be selected from among many other different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, in addition to the decline model 310 using machine learning techniques to determine whether to accept or reject a transaction, it may also use a series of rules. These rules, as described above, include rule predicates, features, and hyperparameters. In an example embodiment, these rules are set on a merchant-by-merchant basis, either automatically, manually, or via a combination of automatic and manual techniques where, for example, rules are suggested to merchants based on prior merchant transaction data and/or merchant transaction data of similar merchants, and the merchants are able to accept, reject, or modify and accept these suggested rules.

These rules are stored in rules repository 314. A random forest model training component 316 may train a random forest model 318 using training data from the system 301. As stated above, in some example embodiments the training data may be supplemented with data from one or more of the merchants 302A-302N, including potentially data that is intended to be kept secret from other components of the system 301.

The random forest model 318 is trained to predict transaction fraud. A random forest classifier 320 is then used to calculate feature importance for all features in the training data, as well as to find the N most important features from the set of all features in the training data. These N most important features are then passed to a rules generator 322, which generates a plurality of rules using various combinations of these N most important features, including rules with various size combinations of predicates up to some predicate combination maximum size, as well as with various combinations of hyperparameters. As mentioned above, in an example embodiment, these candidate features are selected using a quantile technique. A rules backtester 324 then backtests each of the generated rules, and stores the "best" rules in the rules repository 314. As mentioned earlier, the "best" rules are determined based on performance, such as relative increase in revenue/profitability or in comparison to performance of a generic fraud prevention model.

A rules engine 326 in the transaction authorization component 308 may then apply the rules. In some example embodiment, the rules in the rules repository 314 are presented first to the individual merchants 302A-302N as recommendations, which the merchants 302A-302N can then either accept, reject, or modify, prior to being implemented in the rules engine 326.

In an example embodiment, the output of the decline model 310 is a score indicating a likelihood that the potential transaction is fraudulent. What is then done with that score can depend on the implementation and the merchant. In an example embodiment, one or more thresholds are used to classify the score into one of a plurality of different classes or categories. For example, scores lower than a first threshold may be considered "safe" and may be processed immediately, while scores higher than a second threshold may be considered "unsafe" and rejected immediately. Scores between the first threshold and the second threshold may be considered "potentially unsafe" or "medium unsafe," and one or more various interventions may be initiated. For example, for a "potentially unsafe" or "medium unsafe" transaction, the payor may be prompted to verify the physical payment card, such as by answering security questions or holding up the card to a mobile device camera to prove they are in possession of the card, via a photograph taken by the camera. Another example would be requiring a two-factor authentication be passed prior to proceeding with the transaction.

In an example embodiment, these thresholds are completely configurable by the merchants 302A-302N, based on their own tolerance for potential fraud. Certain companies, for example, may value growth above the bottom line and may be less concerned about losing money to fraudulent transactions than in creating friction for transactions, and thus may wish for their thresholds to be set higher. Additionally, the thresholds need not be the same for all transactions of the merchant. Any variable of a transaction can be used as a basis for a particular setting for a threshold. For example, a merchant may set lower thresholds for ACH transactions than credit card transactions, due to the increased chance of fraud. The merchant can also set higher thresholds for low value transactions (e.g., less than $100) than for high value transactions.

By making the thresholds configurable by the merchants, the overall security of the transaction network is increased, as each merchant is able to feel comfortable that their own tolerance for fraudulent transactions is being independently considered. This is in contrast to networks where a single threshold for all merchants is used, and merchants with very low tolerance for fraudulent transactions feel less secure because the threshold is set in a manner that attempts to placate all merchants, including those who have a high tolerance for fraudulent transactions.

Furthermore, in an example embodiment, either historical transaction data or potential transaction data (or both) may be transformed and/or enriched prior to use as either retraining data or input to the model at runtime. This may include, for example, normalizing addresses to known addresses, augmenting a raw IP address with a geographical location, and adding indicators that the transaction was performed via a VPN or from a known bot IP address to the transaction data.

Furthermore, in some example embodiments, machine learning is used more than just for a decline model, and may also be used to predict the thresholds themselves (such as to recommend threshold levels for particular merchants based on historical merchant behavior and merchant attributes) or to suggest interventions (based on historical intervention effectiveness).

Figure 4:
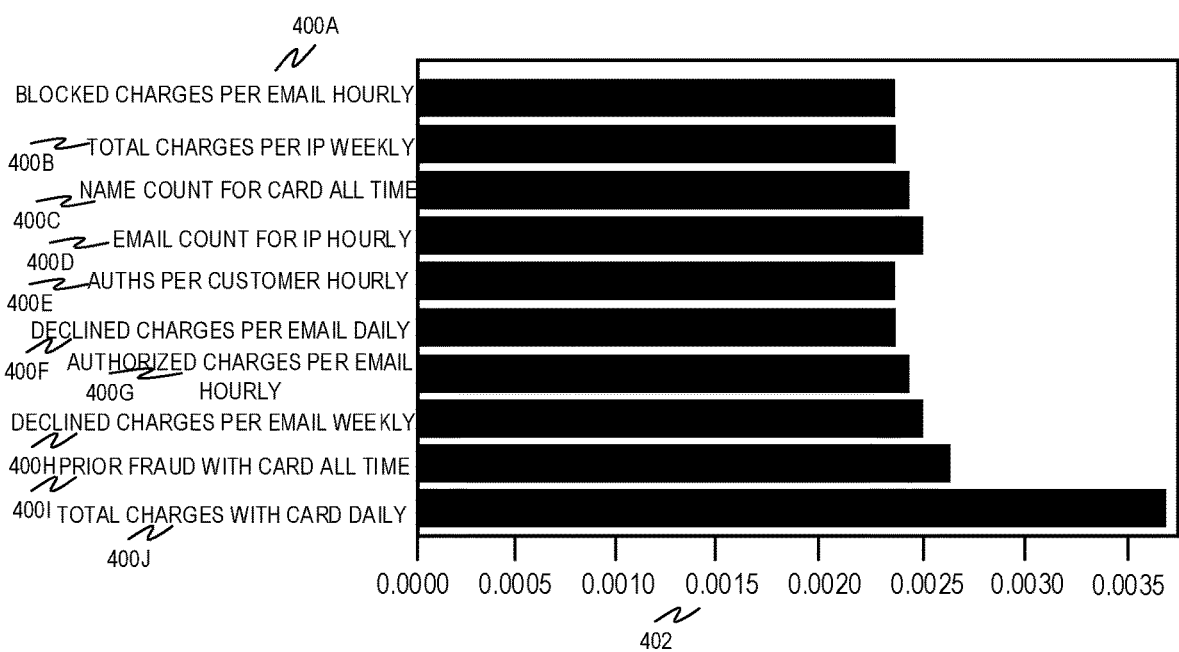
FIG. 4 is a diagram illustrating a chart showing example output of the random forest classifier of FIG. 3, according to some example embodiments.

FIG. 4 is a diagram illustrating a chart showing example output of the random forest classifier 320 of FIG. 3, in accordance with an example embodiment. Here, the N most important features 400A-400J are shown, ranked from top to bottom in increasing order of importance, with axis 402 indicating importance scores.

It should be noted that the importance scores can also be compared with a threshold that is used to determine whether to generate multidimensional rules or not. For example, if N=10, then the 10 most important features are ranked, but only the ones whose importance score exceeds the threshold may be used to generate a rule. If one feature exceeds the threshold, then only that one feature may be used to generate the rule (using a corresponding rule predicate), and the rule may therefore be one-dimensional. If, on the other hand, two or more features exceed the threshold, then the rule may be multidimensional (using rule predicates corresponding to the features whose importance score exceeds the threshold). Additionally, as discussed in more detail below, a maximum number of rule predicates may be implemented, such that it may not be possible to have, for example, all 10 of the 10 most important features be part of the multi-dimensional rule, if the maximum is, for example, 5.

FIG. 5 is a flow diagram illustrating a method 500 of using a random forest machine learning model, in accordance with an example embodiment. At operation 502, a training set of data is accessed. The training set includes data having a plurality of features and pertaining to a first entity of a plurality of entities. In an example embodiment in a transaction system, the first entity may be a first merchant. At operation 504, the training set is used to train a random forest model to output a prediction related to the first entity. In an example embodiment in a transaction system, the prediction related to the first entity is a likelihood that a particular transaction with the first merchant is fraudulent.

At operation 506, an importance score is calculated, using a random forest classifier, for each of the plurality of the features, the importance score indicating a relevance of a corresponding feature to the random forest model's prediction related to the first entity. At operation 508, a set of N features having highest importance scores is identified using the random forest classifier.

At operation 510, a plurality of rules are generated. The plurality of rules each include a combination of rule predicates, one or more features from the set of N features, and one or more thresholds, each of the rule predicates comparing a feature from the one or more features from the set of N features with a threshold from the one or more thresholds. In an example embodiment, generating a plurality of rules includes limiting the generation of rules to those that have no more than a preset maximum number of rule predicates, and this maximum number can vary, depending upon the identity of the first entity.

Further, as described earlier, the one or more hyperparameters may be generated by identifying, for each feature in the set of N features, a plurality of quantiles of actual values of the corresponding feature in the training set, or using a decision tree, boosted tree algorithm, or recursively partitioned tree algorithm.

At operation 512, each of the plurality of rules is tested against historical data to measure performance of each of the plurality of rules. At operation 514, a subset of the plurality of rules is selected based on performance. Finally, at operation 516, the rules are applied using a rules engine, to cause a result for the first entity.

Figure 6:
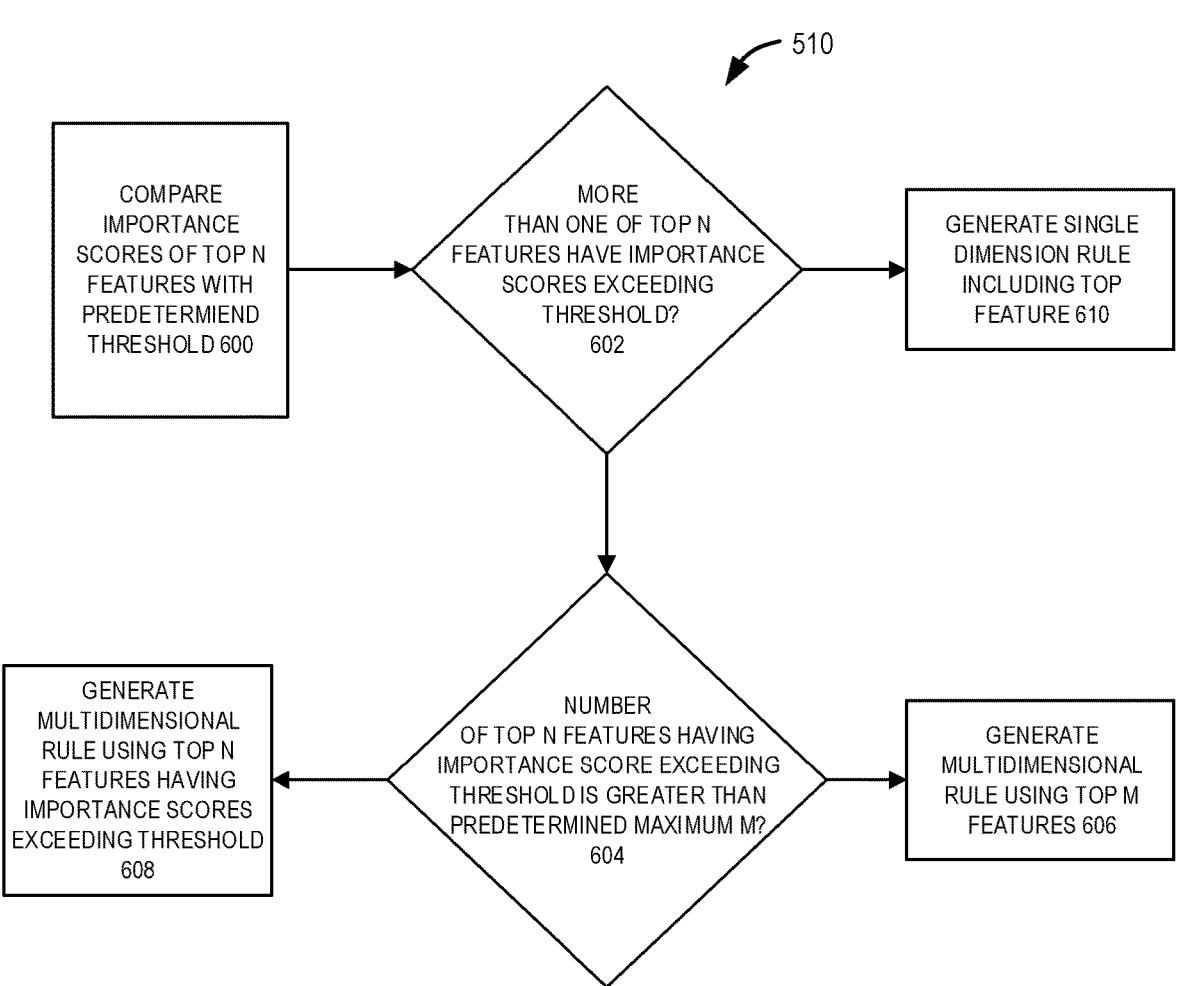
FIG. 6 is a flow diagram illustrating a method for generating a plurality of rules, in accordance with an example embodiment.

While it is possible for the above techniques to be applied to create single dimensional rules (e.g., rules having a single predicate), in practice these techniques may be extended to create multi-dimensional rules (e.g., rules having multiple predicates). FIG. 6 is a flow diagram illustrating a method 510 for generating a plurality of multi-dimensional rules, in accordance with an example embodiment. At operation 600, the importance scores of the top N features are compared with a predetermined threshold. As described above, N may be fixed or may be dynamically determined, or even learned via a machine learning algorithm. Regardless, the importance scores of each of these top N features from the feature set may be calculated using a random forest classifier. The predetermined threshold may also be fixed or dynamically determined, or even learned via a machine learning algorithm.

At operation 602, it is determined if more than one of the top N features have importance scores exceeding the predetermined threshold. If so, then at operation 604, it is determined if the number of top N feature having importance scores exceeding the threshold is greater than a predetermined maximum M. The use of predetermined maximum is based on the assumption that if there are too many predicates in the rule, then the rule at some point will simply become too narrow to be useful, despite the calculations of the importance scores and their comparison to the determined threshold. If the predetermined maximum M is exceeded, then at operation 606 a multidimensional rule containing the top M features is generated (i.e., the rule is limited to M predicates, even if N is greater than M). If not, then at operation 608, a multidimensional rule containing the top N features having importance scores exceeding the threshold is generated (i.e., the rule will contain N predicates, because N is less than or equal to M).

If, on the other hand, it is determined at operation 602 that not more than one of the top N features having importance scores exceeding the threshold, then a single dimension rule including the top feature is generated at operation 610.

Described implementations of the subject matter can include one or more features, alone or in combination as illustrated below by way of example.

Example 1. A method comprising:
    accessing a training set of data, the training set including data having a plurality of features and pertaining to a first entity of a plurality of entities;
    using the training set to train a random forest model to output a prediction related to the first entity;
    calculating, by at least one hardware processor, using a random forest classifier, an importance score for each of the plurality of the features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds;

testing each of the plurality of rules against historical data to measure performance of each of the plurality of rules;

selecting a subset of the plurality of rules based on performance; and applying the rules using a rules engine, to cause a result for the first entity.

Example 2. The method of Example 1, wherein the first entity is a first merchant and the prediction related to the first entity comprises a likelihood that a particular transaction with the first merchant is fraudulent.

Example 3. The method of Examples 1 or 2, wherein the generating a plurality of rules includes limiting the generation of rules to only rules that have no more than a preset maximum number of rule predicates.

Example 4. The method of Example 3, wherein the preset maximum number of rule predicates varies depending upon an identity of the first entity.

Example 5. The method of Example 3, wherein N is determined by passing at least some of the training set to a separate machine learning model trained to identify an ideal number of important features.

Example 6. The method of Example 3, wherein the one or more thresholds are generated by identifying, for each feature in the set of N features, a plurality of quantiles of actual values of the corresponding feature in the training set.

Example 7. The method of any of Examples 1-6, wherein the one or more thresholds are generated using a decision tree.

Example 8. The method of any of Examples 1-7, wherein the one or more thresholds are generated using a boosted tree algorithm.

Example 9. The method of any of Examples 1-8, wherein the one or more thresholds are generated using a recursively partitioned tree algorithm.

Example 10. The method of any of Examples 1-9, wherein the plurality of features includes features that are contained in training data that is kept private by the first entity.

Example 11. The method of any of Examples 1-10, further comprising:

applying the rules using the rules engine, to cause a result for a second entity similar to the first entity.

Example 12. A system comprising:

one or more processors; and at least one memory storing instructions that, when executed by at least one processor among the one or more processors, cause the at least one processor to perform operations comprising:

accessing a training set of data, the training set including data having a plurality of features and pertaining to a first entity of a plurality of entities;

using the training set to train a random forest model to output a prediction related to the first entity;

calculating, using a random forest classifier, an importance score for each of the plurality of the features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds;

testing each of the plurality of rules against historical data to measure performance of each of the plurality of rules;

selecting a subset of the plurality of rules based on performance; and applying the rules using a rules engine, to cause a result for the first entity.

Example 13. The system of Example 12, wherein the first entity is a first merchant and the prediction related to the first entity is a likelihood that a particular transaction with the first merchant is fraudulent.

Example 14. The system of Examples 12 or 13, wherein the generating a plurality of rules includes limiting the generation of rules to only rules that have no more than a preset maximum number of rule predicates.

Example 15. The system of Example 14, wherein the preset maximum number of rule predicates varies depending upon an identity of the first entity.

Example 16. The system of Example 14, wherein N is determined by passing at least some of the training set to a separate machine learning model trained to identify a number of important features.

Example 17. The system of Example 14, wherein the one or more thresholds are generated by identifying, for each feature in the set of N features, a plurality of quantiles of actual values of the corresponding feature in the training set.

Example 18. The system of any of Examples 12-17, wherein the plurality of features includes features that are contained in training data that is kept private by the first entity.

Example 19. The system of any of Examples 12-18, further comprising:

applying the rules using the rules engine, to cause a result for a second entity similar to the first entity.

Example 20. A non-transitory machine-readable medium comprising instructions which, when read by a machine, cause the machine to perform operations comprising:

accessing a training set of data, the training set including data having a plurality of features and pertaining to a first entity of a plurality of entities;

using the training set to train a random forest model to output a prediction related to the first entity;

calculating, using a random forest classifier, an importance score for each of the plurality of the features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds;

testing each of the plurality of rules against historical data to measure performance of each of the plurality of rules;

selecting a subset of the plurality of rules based on performance; and applying the rules using a rules engine, to cause a result for the first entity.

Figure 7:
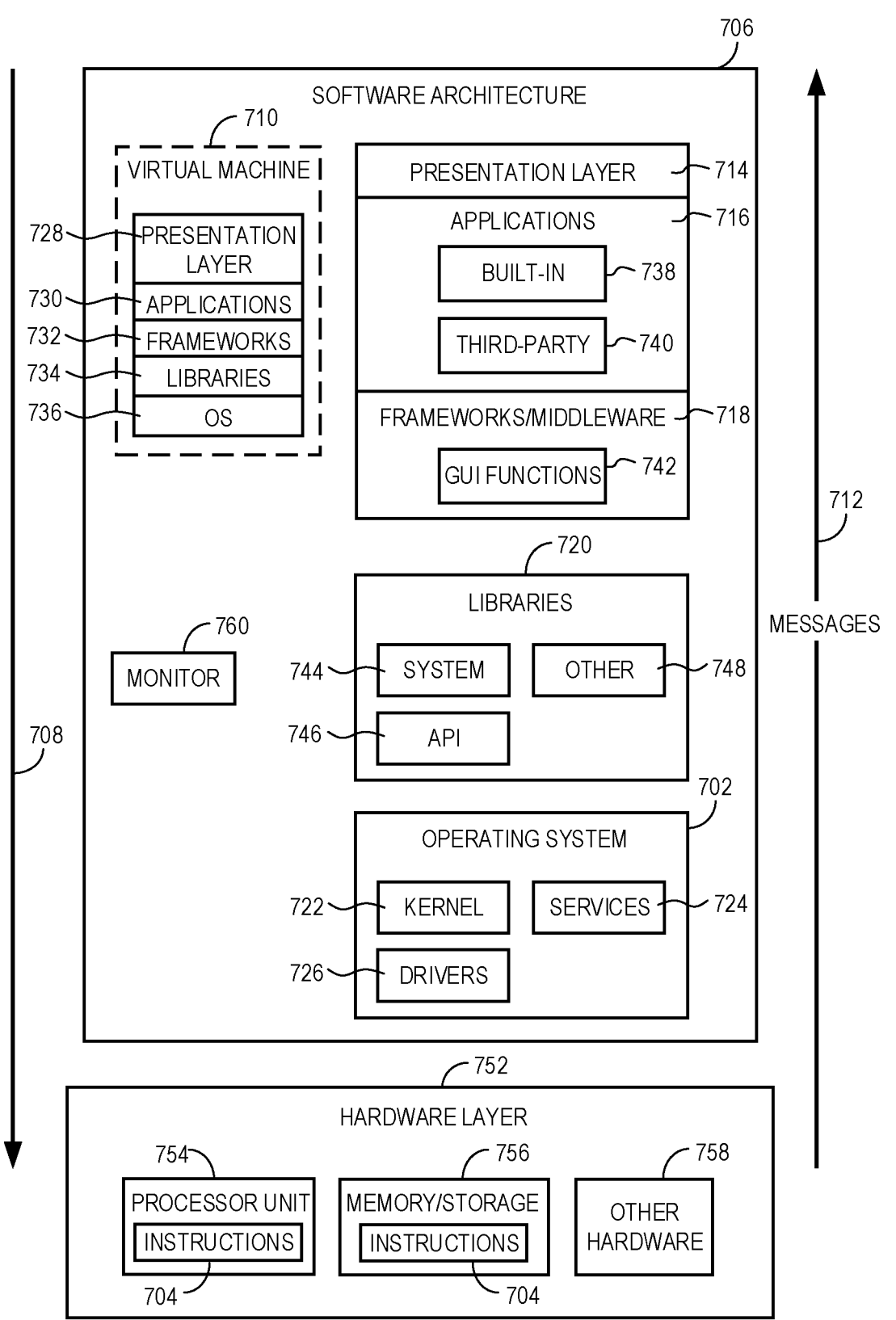
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes memory and/or storage modules as memory/storage 756, which also have the executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 7D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various graphic user interface (GUI) functions 742, high-level resource management, high-level location services, and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include any application developed using the ANDROID™ or IOS™ software development kit (SDK) by an entity other than the vendor of the particular platform and may be mobile software running on a mobile operating system such as IOS™ ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8). The virtual machine 710 is hosted by a host operating system (e.g., the operating system 702 in FIG. 7) and typically, although not always, has a virtual machine monitor 760, which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Figure 8:
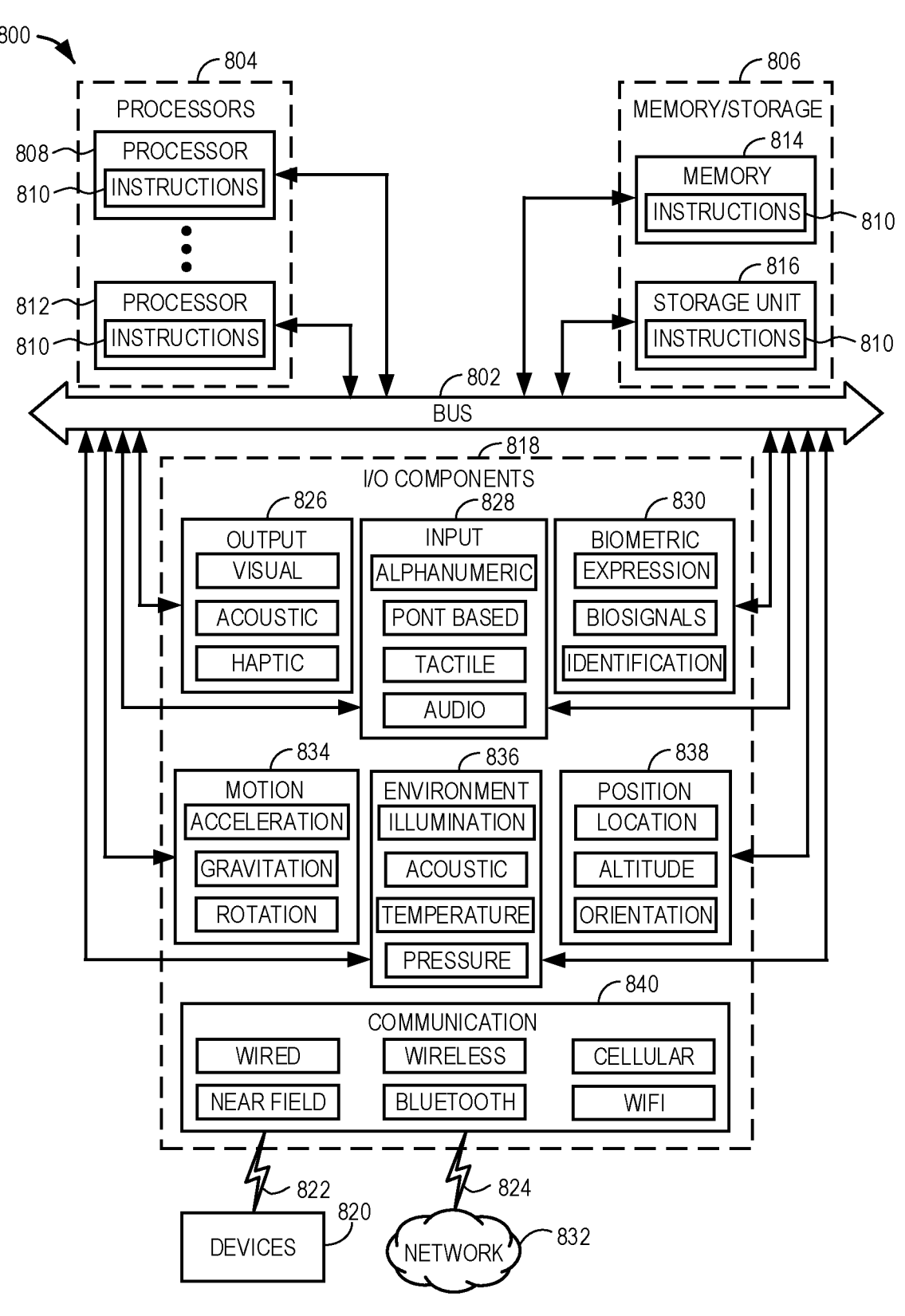
FIG. 8 is a block diagram illustrating components of a machine, according to some example embodiments, that is able to read instructions from a machine-readable medium (e.g., a machine-readable storage medium) and perform any one or more of the methodologies discussed herein.

FIG. 8 is a block diagram illustrating components of a machine 800, according to some example embodiments, that is able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code), for causing the machine 800 to perform any one or more of the methodologies discussed herein, may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804 (including processors 808 and 812), memory/storage 806, and I/O components 818, which may be configured to communicate with each other such as via a bus 802. The memory/storage 806 may include a memory 814, such as a main memory or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion; the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840, operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply validation and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant and merchant servers are associated with the merchant site. The merchant site is associated with a client-side application and a server-side application.

"Payment Processor" in this context refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2022, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for using one or more rules to classify a prediction related to a first entity, wherein the one or more rules are used to classify a prediction related to a second entity, comprising:

accessing a training set of data, the training set of data including data having a plurality of features and pertaining to the first entity;

using the training set of data to train a random forest model to output the prediction related to the first entity;

calculating, by at least one hardware processor, using a random forest classifier, an importance score for each of the plurality of features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds, wherein each of the generated plurality of rules includes no more than a first preset maximum number of rule predicates, wherein the first preset maximum number of rule predicates for the first entity is different than a second preset maximum number of rule predicates for the second entity;

testing each of the plurality of rules against historical data to measure performance of each of the plurality of rules;

selecting a subset of the plurality of rules based on the respective performance of each of the plurality of rules meeting a performance threshold; and applying the subset of the plurality of rules using a rules engine, to classify the prediction related to the first entity, the subset of the plurality of rules including the one or more rules used to classify the prediction related to the second entity.

2. The method of claim 1, wherein the first entity is a first merchant and the prediction related to the first entity comprises a likelihood that a particular transaction with the first merchant is fraudulent.

3. The method of claim 1, wherein N is determined by passing at least some of the training set of data to a separate machine learning model trained to identify a number of important features.

4. The method of claim 1, wherein the one or more thresholds are generated by identifying, for each feature in the set of N features, a plurality of quantiles of actual values of the corresponding feature in the training set.

5. The method of claim 1, wherein the one or more thresholds are generated using a decision tree.

6. The method of claim 1, wherein the one or more thresholds are generated using a boosted tree algorithm.

7. The method of claim 1, wherein the one or more thresholds are generated using a recursively partitioned tree algorithm.

8. The method of claim 1, wherein the plurality of features includes features that are contained in training data that is kept private by the first entity.

9. The method of claim 1, wherein one or more of the plurality of rules includes two or more predicates to establish a multi-dimensional rule.

10. A system for using one or more rules to classify a prediction related to a first entity, wherein the one or more rules are used to classify a prediction related to a second entity, comprising:

one or more processors; and at least one memory storing instructions that, when executed by at least one processor among the one or more processors, cause the at least one processor to perform operations comprising:

accessing a training set of data, the training set including data having a plurality of features and pertaining to the first entity;

using the training set of data to train a random forest model to output the prediction related to the first entity;

calculating, by at least one hardware processor, using a random forest classifier, an importance score for each of the plurality of features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds, wherein each of the generated plurality of rules includes no more than a first preset maximum number of rule predicates, wherein the first preset maximum number of rule predicates for the first entity is different than a second preset maximum number of rule predicates for the second entity;

testing each of the plurality of rules against historical data to measure performance of each of the plurality of rules;

selecting a subset of the plurality of rules based on the respective performance of each of the plurality of rules meeting a performance threshold; and applying the subset of the plurality of rules using a rules engine, to classify the prediction related to the first entity, the subset of the plurality of rules including the one or more rules used to classify the prediction related to the second entity.

11. The system of claim 10, wherein the first entity is a first merchant and the prediction related to the first entity is a likelihood that a particular transaction with the first merchant is fraudulent.

12. The system of claim 10, wherein N is determined by passing at least some of the training set of data to a separate machine learning model trained to identify a number of important features.

13. The system of claim 10, wherein the one or more thresholds are generated by identifying, for each feature in the set of N features, a plurality of quantiles of actual values of the corresponding feature in the training set.

14. The system of claim 10, wherein the plurality of features includes features that are contained in training data that is kept private by the first entity.

15. A non-transitory machine-readable medium comprising instructions which, when read by a machine, cause the machine to perform operations for using one or more rules to classify a prediction related to a first entity, wherein the one or more rules are used to classify a prediction related to a second entity, the operations comprising:

accessing a training set of data, the training set of data including data having a plurality of features and pertaining to the first entity;

using the training set of data to train a random forest model to output the prediction related to the first entity;

calculating, using a random forest classifier, an importance score for each of the plurality of features, the importance score indicating a relevance of a corresponding feature to the prediction related to the first entity;

identifying, using the random forest classifier, a set of N features having highest importance scores;

generating a plurality of rules, the plurality of rules each including a combination of rule predicates, one or more features from the set of N features, and one or more thresholds, each of the rule predicates comparing a feature from the one or more features from the set of N features with a threshold from the one or more thresholds, wherein each of the generated plurality of rules includes no more than a first preset maximum number of rule predicates, wherein the first preset maximum number of rule predicates for the first entity is different than a second preset maximum number of rule predicates for the second entity;

testing each of the plurality of rules against historical data to measure performance of each of the plurality of rules;

selecting a subset of the plurality of rules based on the respective performance of each of the plurality of rules meeting a performance threshold; and applying the subset of the plurality of rules using a rules engine, to classify the prediction related to the first entity, the subset of the plurality of rules including the one or more rules used to classify the prediction related to the second entity.

16. The non-transitory machine-readable medium of claim 15, wherein the first entity is a first merchant and the prediction related to the first entity comprises a likelihood that a particular transaction with the first merchant is fraudulent.

17. The non-transitory machine-readable medium of claim 15, wherein N is determined by passing at least some of the training set of data to a separate machine learning model trained to identify a number of important features.

18. The non-transitory machine-readable medium of claim 15, wherein the one or more thresholds are generated by identifying, for each feature in the set of N features, a plurality of quantiles of actual values of the corresponding feature in the training set.

19. The non-transitory machine-readable medium of claim 15, wherein the plurality of features includes features that are contained in training data that is kept private by the first entity.

20. The non-transitory machine-readable medium of claim 15, wherein one or more of the plurality of rules includes two or more predicates to establish a multi-dimensional rule.

\* \* \* \* \*